United States Patent Office 2,866,477
Patented Dec. 30, 1958

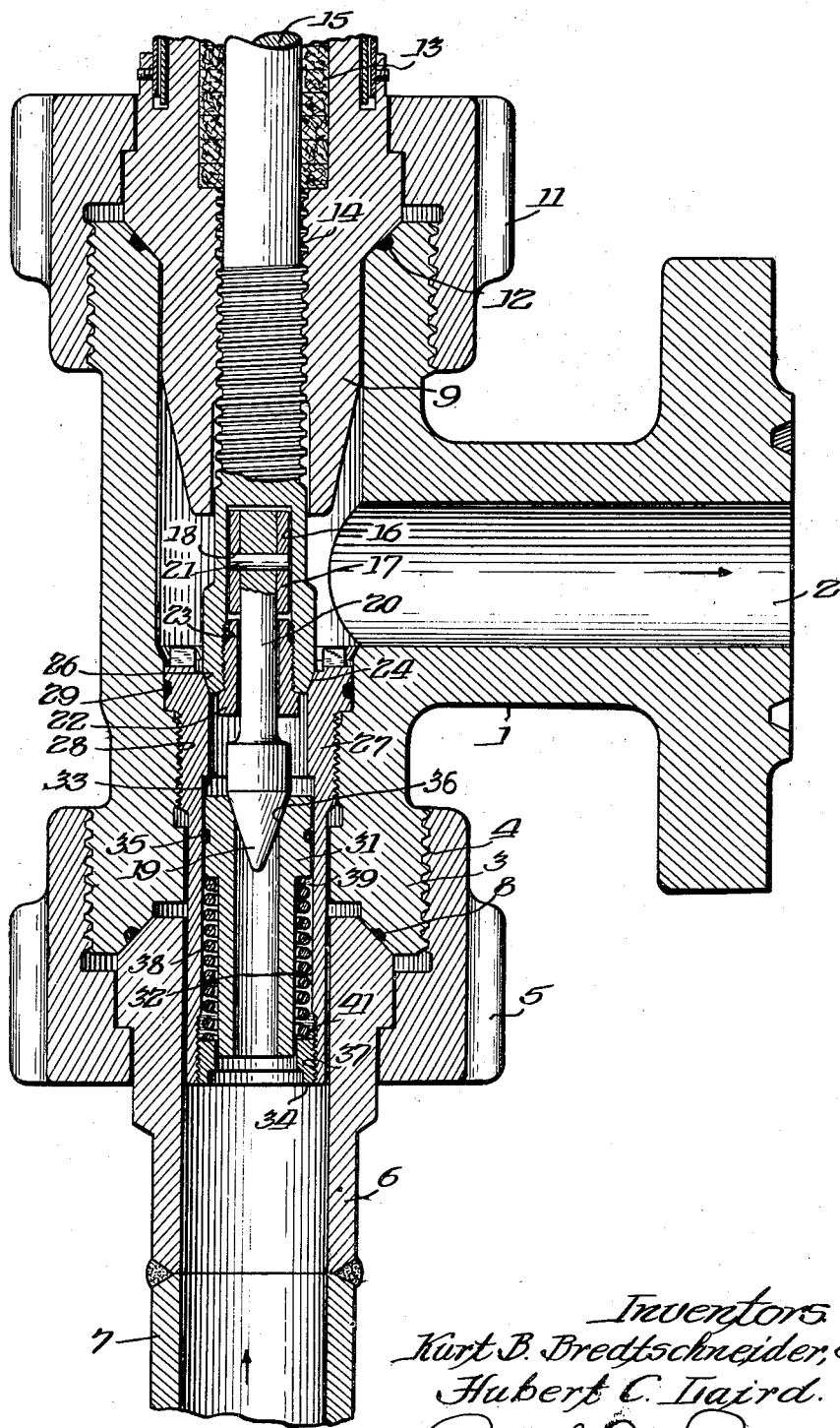

2,866,477

COMBINED THROTTLE AND STOP VALVE

Kurt B. Bredtschneider, Chicago, and Hubert C. Laird, Oak Park, Ill., assignors to Crane Co., Chicago, Ill., a corporation of Illinois Application March 19, 1954, Serial No. 417,479

3 Claims. (Cl. 137—628)

The present invention relates to a novel valve structure incorporating separate shut-off and throttling elements, and more particularly, pertains to a throttling valve structure, particularly adapted to handle relatively high rates of fluid flow.

For a better appreciation of the contribution made to the art by our invention, it should be noted that heretofore throttling valves interposed in pipe lines servicing high rates of fluid flow were subjected to rapid wear and deterioration occasioned by the high velocity fluids striking and flowing over the affected valve parts, namely, the valve seat and closure member. This rapid erosion of the critical valve seat and closure member resulted in a situation wherein a valve being virtually new in every other respect was forced to be withdrawn from service because of the rapid erosion and malfunctioning of these two vital parts.

The erosive action of the fluids passing through the valves is progressively more pronounced as the valve closure member approaches the seat and the valve passage is decreased in area. This wire drawing or erosive action increases in intensity since the fluid passing through the smaller valve passage is forced to attain a greater velocity in transit through the valve. The increased velocity naturally results in an increased fluid momentum and therefore the rate of erosion or the critical valve parts being struck by the fluid is correspondingly increased.

Our invention finds ready application, for example, in the oil fields in controlling the flow from a high pressure oil or gas well. It has been common practice in the control of these wells to utilize a fixed or adjustable orifice, or choke to govern the rate of withdrawal. It is also customary to use a positive shut-off valve, commonly called a wing valve upstream from the choke to close-in or completely shut off all flow from the well. A conventional throttling valve or adjustable choke is not suitable to serve the above purposes owing to the fact that the seating surfaces may be damaged by wire-drawing.

In operating a flowing well the accepted practice is to flow the well with the wing valve fully open to protect it against damage by flow. Before closing the wing valve to shut the well in, as it is termed, the adjustable choke is first closed to prevent throttling by the wing valve. Conversely, to resume flow, the wing valve is completely opened while the adjustable choke is in the closed position.

It is a primary object therefore of our invention to provide a valve which will perform the functions of both a wing valve and adjustable choke in the proper sequence. Such a valve has the accompanying advantages of decreasing both the installation expense as well as the valve operating expense.

It is a secondary object of our invention to present a valve structure which is readily adaptable to a variety of uses, as will hereinafter be explained in greater detail.

These and other objects will become more apparent upon proceeding with the following detailed description read in the light of the accompanying drawing which is a fragmentary sectional assembly view of a valve embodying my invention, in which the fluid pressure originates below the valve seats.

Referring now to the drawing, an angle valve is fragmentarily depicted comprising a body or casing 1 having the outlet 2 which is flanged for the usual connection to a pipeline. Casing inlet 3 is suitably threaded at 4 for engaging the inlet union ring 5 which secures the valve inlet to a welding tailpiece 6. Interposed O-ring 8 maintains the casing 1 and tailpiece 6 in fluid sealing engagement. Although the tailpiece 6 is illustrated as being welded to the pipeline 7, it is, of course, obvious that other suitable means of attachment such as threads or flanges may be used. Similarly, outlet 2 may be threaded or otherwise suitably formed for engagement with the pipeline.

The bonnet or centerpiece member 9 is connected to the casing 1 by means of the bonnet union ring 11. The O-ring 12 maintains the bonnet-casing connection in fluid-tight relation. The packing 13 positioned above the bonnet threads 14 prevents the escape of fluid through the bonnet stem opening (not shown).

The stem 15 which threadedly engages the bonnet 9 at 14 is reciprocally movable within the casing 1. The lower portion of the stem 15 is recessed at 16 for insertion of shoulder ring 17 which is apertured at 18 to enable shank portion 20 of the throttling cone 19 to be affixed to the shoulder ring 17 by means of the pin 21. Securing nut 22 maintains the throttling cone assembly within the stem recess 16, by engaging the threaded portion 23 of the stem recess.

It will be noted that the lower end limit of the stem 15 is chamfered thereby forming a sealing shut-off surface or cone 24 which abuts against the annular seating surface 26 of the casing sleeve 27 in effecting a valve closure. The sleeve 27 threadedly engages the casing at 28 and maintains a fluid-tight relationship with latter member by means of the interposed O-ring 29.

The throttling seat member 31 is annularly recessed at 36 to form a seating surface for the throttling cone 19 and is reciprocally movable within the casing sleeve chamber 32 as defined by the internal sleeve shoulder 33 and the seat nut 34 which threadedly engages the lower portion of the casing sleeve at 37. Spring member 38 abuts against the seat member shoulder 39 at its upper end limit and against the seat nut surface 41 at its lower end limit and thus tends to force the seat member 31 into abutting relationship with the casing sleeve shoulder 33. The O-ring 35 maintains a fluid-tight seal between the casing sleeve 27 and the seat member 31.

In the normal course of operation, the valve functions as follows: In the open position, shut-off cone 24 is withdrawn from the seating surface 26 of the casing sleeve 27. Throttling cone 19 is withdrawn from the seating surface 36 into a throttling position allowing flow to progress from the inlet 3 to the outlet 2. Spring member 38 maintains throttling seat member 31 in abutting relation with the sleeve shoulder 33. As the valve is closed, it will be noted that throttling cone 19 approaches its seating surface 36, thereby obviously decreasing the intervening space through which the flowing fluid may pass. The valve passage being decreased in area, the velocity, and as a result the momentum, of the fluid is proportionately increased. However, the force of the fluid impact is expended on the surfaces of throttling cone 19 and seat 31. The shut-off cone 24 is still a sufficient distance from the shut-off seating surface 26 so that neither of the latter two members will be exposed to the eroding effects of the fluid which has been substantially lowered in velocity after passing through the initial throttling zone. The flow may thus be regulated by adjusting the distance of the throttling cone 19 from its seat 36 without any harm, such as cutting out, being done to the shut-off member 24 and its seat 26.

In effecting the final closure throttling cone 19 contacts throttling seating surface 36 before the shut-off cone 24 has contacted the shut-off surface 26. The reciprocally movable throttling seat member 31 is then forced downward in the casing sleeve chamber 32 until the shut-off cone 24 abuts the shut-off surface 26 in fluid sealing engagement therewith. It is thus apparent that at no time are the shut-off cone and seat subject to the eroding action or the wire drawing effect of the fluid in transit through the valve.

The illustrated valve construction may be readily converted into a normal shut-off valve by removing the throttling assembly comprising the securing nut 22, shoulder ring 17, pin 21, and the throttling cone 19, plus throttling seat member 31, spring member 38 and O-ring 35. It should further be noted at this time that the illustrated valve may be used with a stationary throttling disc having a fixed orifice which disc threadedly engages the casing sleeve 27 instead of, or with, the seat nut 34.

It should also be noted at this time that the shut-off cone and throttling cone may both be integral with the stem 15 if the flexibility above mentioned is not needed and a permanent combination shut-off and throttling valve is desired.

It should also be noted that the size of the fluid passage in the vicinity of the shut-off seat at the time of the initial throttling may be determined in advance by fixing the length of the casing sleeve chamber 32 in which the throttling seat member reciprocally moves. The length of the respective chambers fixes the travel of the throttling member 19 which in turn regulates the distance the shut-off cone is removed from its seat at the instant of initial throttling.

Thus, we have presented a throttling valve structure heretofore unknown in the art possessing the salient features of dual performance and ready adaptability to a variety of functions.

In light of the flexibility and ready adaptability exhibited by the valve structure illustrated, it is apparent to those skilled in the art that many changes in structure may be effected which still retain our inventive principle and we therefore wish to be limited only by the appended claims.

We claim:

1. In a flow regulating valve, the combination comprising a casing member, a fluid passageway therethrough, a stem member reciprocally movable in said casing member, said stem member having a hollow shut-off cone portion and having depending therefrom in the fluid passageway a throttling cone telescopically mounted for predetermined longitudinal movement relative to the said stem member, a seat for said shut-off cone comprising a removable sleeve member having a shoulder portion receivable within the said casing member and providing a seat for said throttling cone, the said latter seat being yieldably telescopically received in said sleeve and being substantially contained and supported therewithin to form a restricted or throttling portion in the fluid passageway, the said stem having a lower annular shoulder portion engageable with the said throttling cone to limit the movement of the said latter cone in a direction toward its seat.

2. In a flow regulating valve, the combination comprising a casing member having a fluid inlet, a fluid outlet and a passage interconnecting the inlet and outlet, the passage having a seat and a seating surface arranged therein, a bonnet member affixed thereto, a hollow stem member in the said bonnet member reciprocally movable in said casing member in the normal course of valve operation and having a fluid sealing outer annular surface defining the lower limits of the hollow portion of the said stem member, fluid throttling means depending from said stem member and axially movable relative thereto, an annular axially movable seat for the said throttling means, the said casing member having an annular seating surface for said stem outer annular surface, means mounted within a hollow portion of the said member for defining the limit of axial movement of the said throttling means and for retaining a portion of the said throttling means in the said stem member, resilient means cooperating with the seat and opposing the downward axial movement of said stem member in the course of effecting a fluid sealing valve closure, the said resilient means being shouldered within the said casing member to support said axially movable seat and said depending throttling means at a predetermined position in the closing movement of the said valve.

3. In a flow regulating valve substantially as described, the combination comprising a casing member having a fluid inlet, a fluid outlet and a passage interconnecting the inlet and outlet, the passage having a seat and a seating surface arranged therein, a bonnet member affixed thereto, a hollow stem member reciprocally movable in the said bonnet member in the normal course of valve operation, flow stop means associated with an end portion of the said hollow stem member defining the lower limits of said stem member, a seating member for said flow stop means supported by said casing member, a throttling member telescopically received in the said hollow stem member and mounted therewithin for limited axial movement relative to the said stem member, yieldably mounted seat means guided within said seating member for said throttling member, shoulder means on said throttling member carried within the hollow portion of the said stem member and engaged thereby to normally hold said throttling member to said seat means, the said stem member having a lower stop engaging the shoulder means of said throttling member to limit axial movement of said throttling means in a direction toward said seat means when the said stem is moved predeterminately axially, the said throttling member being snugly guided by the shoulder means within said stem hollow portion.

References Cited in the file of this patent

UNITED STATES PATENTS

| | | |
|---|---|---|
| 208,986 | Patterson | Oct. 15, 1878 |
| 969,803 | Pollock | Sept. 13, 1910 |
| 1,136,606 | Loyd | Apr. 20, 1915 |
| 1,152,604 | Coll | Sept. 7, 1915 |
| 1,547,398 | Jones | July 28, 1925 |
| 2,213,488 | Dowrick | Sept. 3, 1940 |
| 2,500,156 | Dechant | Mar. 14, 1950 |

FOREIGN PATENTS

| | | |
|---|---|---|
| 740,137 | France | of 1933 |